United States Patent
Cecchi et al.

(10) Patent No.: US 10,807,909 B2
(45) Date of Patent: Oct. 20, 2020

(54) COMPOSITION FOR USE IN BUILDING CONSTRUCTION

(71) Applicants: LABORATORI ARCHA S.R.L., Loc. Ospedaeletto, Pisa (IT); PERSONAL FACTORY S.P.A., Simbario (IT)

(72) Inventors: Antonio Cecchi, Pisa (IT); Francesco Vito Tassone, Serra San Bruno (IT)

(73) Assignees: LABORATORI ARCHA S.R.L., Pisa (IT); PERSONAL FACTORY S.P.A., Simbario (IT)

( * ) Notice: Subject to any disclaimer, the term of this patent is extended or adjusted under 35 U.S.C. 154(b) by 78 days.

(21) Appl. No.: 16/075,155

(22) PCT Filed: Feb. 3, 2017

(86) PCT No.: PCT/IB2017/050601
§ 371 (c)(1),
(2) Date: Aug. 3, 2018

(87) PCT Pub. No.: WO2017/134621
PCT Pub. Date: Aug. 10, 2017

(65) Prior Publication Data
US 2019/0062212 A1    Feb. 28, 2019

(30) Foreign Application Priority Data
Feb. 5, 2016  (IT) .................. 102016000012275

(51) Int. Cl.
| C04B 18/24 | (2006.01) |
| C04B 28/02 | (2006.01) |
| C04B 28/08 | (2006.01) |
| C04B 14/06 | (2006.01) |
| C04B 24/38 | (2006.01) |
| C04B 111/00 | (2006.01) |

(52) U.S. Cl.
CPC ............ C04B 18/243 (2013.01); C04B 14/06 (2013.01); C04B 24/386 (2013.01); C04B 28/02 (2013.01); C04B 28/08 (2013.01); C04B 2111/00637 (2013.01); Y02W 30/97 (2015.05)

(58) Field of Classification Search
CPC ..... C04B 14/06; C04B 18/243; C04B 24/386; C04B 28/02; C04B 28/08; C04B 2111/00637
See application file for complete search history.

(56) References Cited

U.S. PATENT DOCUMENTS 5,800,719 A    9/1998  Sutman et al.

FOREIGN PATENT DOCUMENTS

CN    105503100 A  *  4/2016

OTHER PUBLICATIONS

Geng X, et al., "Characteristics of paper mill sludge and its utilisation for the manufacture of medium density fiberboard", Wood and Fiber Science, vol. 39, No. 2, Dec. 31, 2007, pp. 345-351.
Pala H et al., "Enzymatic versus chemical deinking of non-impact ink printed paper", Journal of Biotechnology, vol. 108, No. 1, Feb. 1, 2004, pp. 79-89.
Search Report and Written Opinion of PCT/IB2017/050601 dated May 24, 2017.
Yan S. et al., "Utilising de-inking waste residues for manufacturing construction products", Proceedings of 2nd Australasian Industrial Ecology Conference, Sep. 3, 2010, pp. 1-7.

* cited by examiner

*Primary Examiner* — Anthony J Green
(74) *Attorney, Agent, or Firm* — Silvia Salvadori, P.C.; Silvia Salvadori

(57) ABSTRACT

The invention relates to a composition for building construction comprising a paper sludge deriving from de-inked paper recycling processes, the sludge having a grain size distribution D90 in the range of 30 to 1000 μm and an ingredient selected from the group consisting of modified cellulose, cement, furnace slag and mixtures thereof.

13 Claims, 1 Drawing Sheet

COMPOSITION FOR USE IN BUILDING CONSTRUCTION

This application is a U.S. national stage of PCT/IB2017/050601 filed on 3 Feb. 2017, which claims priority to and the benefit of Italian Application No. 102016000012275 filed on 5 Feb. 2016, the contents of which are incorporated herein by reference in their entireties.

FIELD OF THE INVENTION

The invention relates to an additive for use in building construction, preferably for the preparation of cementitious compositions. Specifically, the invention relates to the use of a paper sludge resulting from de-inked paper recycling processes and having a particle size distribution in the range of 30 to 1000 µm as an additive in the preparation of compositions for building construction.

STATE OF THE ART

Many of the compositions generally used in building construction, such as for example adhesive compositions, mortars for bedding, plasters, mortar for repair, self-leveling, joining grouts and skim coats, comprise varying amounts of rheology modifiers, such as cellulose derivatives, for example, hydroxyethyl cellulose, methylhydroxy ethylcellulose or carboxymethyl cellulose. These rheology modifiers are used for various purposes, such as to modify the final consistency, to vary the water requirement, to increase the retention of water, to vary the speed of the cements hydration, to improve the development of the consistency, or to increase the slip resistance.

Hydroxyethyl cellulose and analogous cellulosic derivatives are typically produced from a bleached chemical pulp source. Through chemical, mechanical and thermal processes paper pulps are in fact prepared from woody plants or cotton. The noble and expensive part of the pulp obtained consists of cellulosic material. Therefore the production of such cellulose derivatives not only requires the use of the expensive part obtained from the paper mill during woodworking, that is, cellulose rich pulp, but also it requires the reaction and dissolution of the same in caustic and concentrated solutions, the cellulose derivatives resulting therefore extremely expensive additives for the construction industry.

For example, in EP2653508 there is described an attempt to reduce the cellulosic components used as additives in the preparation of paints by use of micro-fibrillated cellulose, i.e. a set of isolated microfibrils. The micro-fibrillation process of cellulose is indicated as less expensive than the dissolution and reaction of the same in caustic and concentrated solutions.

In WO2011/039423 a mixture for cement composition is described, which comprises micro-fibrillated cellulose or a chemically labile cellulose pulp. This composition allows a good stabilization of concrete with high water/cement ratios, avoiding unwanted trickling and thus improving the workability of the concrete.

However, reducing the use of modified celluloses, in general, for the building industry appears to be a goal far to be overcome.

Object of the present invention is therefore to provide a composition for building construction that reduces the amount of modified cellulose and, consequently, the production cost of binding compositions, while maintaining the rheological and workability properties needed to use them.

SUMMARY

The inventors of the present invention have surprisingly discovered that the sludge resulting from de-inking processes in paper recycling, having a specific grain size distribution D90 in the range of 30 to 1000 µm, can be used as additives of compositions for building construction.

The object indicated above has been achieved by providing a composition for building construction comprising a paper sludge deriving from de-inked paper recycling, the sludge having a grain size distribution D90 in the range of 30 to 1000 µm and an ingredient selected from the group consisting of modified cellulose, cement, furnace slag and mixtures thereof.

In the present invention the following must be understood:

sludge: this is a sludge resulting from de-inked paper recycling processes, having a water content of less than 35%, obtained by means of treatments aimed at reducing its initial water content, such as typically drying treatments;

furnace slag: this is a blast furnace material obtained as a by-product of the production of cast iron with characteristics very similar to those of Portland cement; in the present invention, we preferred the granular slag made through rapid cooling and then finely ground, commercially known with the acronym GGBFS (or Ground Granulated Blast Furnace Slag);

modified cellulose: this is a cellulose chemically modified in the structure; in particular, it is selected from the group consisting of methyl hydroxyethyl cellulose, methyl hydroxypropyl cellulose, hydroxyethyl cellulose, cellulose derived from guar rubbers, and other cellulose derivatives normally used in the industry. It is well known that recycled paper is an additional source of pulp to be used in the paper industry and that the recycled pulp subjected to de-inking is added to cellulose virgin pulp in the paper industry.

The sludge used in the composition of the invention is derived from the de-inked paper recycling processes and is a paper industry waste that needs to be disposed of. Considering that, as in Europe, its production is around million tonnes per year, it is clear that its disposal represents a significant cost for the paper industry.

Instead, the inventors have surprisingly found that they could add such a sludge, optionally further dried, ground and/or sieved, as an additive in compositions for building construction to replace part of the cellulose derivatives, thus allowing an alternative use thereof and thus avoiding the related disposal costs.

In a first preferred embodiment the composition for building construction comprises a paper sludge deriving from de-inked paper recycling processes, the sludge having a grain size distribution D90 in the range of 30 to 1000 µm and an ingredient selected from the group consisting of cement, furnace slag and a mixture of cement and furnace slag.

In a further preferred embodiment the composition for building construction comprises a sludge deriving from de-inked paper recycling processes and modified cellulose, the sludge having a grain size distribution D90 in the range of 30 to 1000 µm.

In yet a further preferred embodiment the composition for building construction comprises a paper sludge deriving from de-inked paper recycling processes, the sludge having a grain size distribution D90 in the range of 30 to 1000 µm, and an ingredient selected from the group consisting of cement, furnace slag and a mixture of cement and furnace slag and modified cellulose.

These compositions for building construction, comprising a paper sludge deriving from de-inked paper recycling processes, the sludge having a grain size distribution D90 in the range of 30 to 1000 µm, and an ingredient selected from the group consisting of modified cellulose, cement, furnace slag and mixtures thereof, can be effectively used as base compositions for the preparation of a large number of compositions normally used in the building industry, such as adhesive compositions, compositions for bedding mortars, compositions for skim coats, compositions for repair mortars, compositions for self-leveling mortars, compositions for plasters, compositions for joining grouts, wherein the presence of said sludge allows the use of total amount of modified cellulose definitely lower than those currently used.

Surprisingly, in fact, the sludge resulting from de-inked paper recycling processes, having a grain size distribution in the range of 30 to 1000 µm, can reduce the amount of modified cellulose to 50-60% of its common dosage in these compositions, while continuing to ensure at the same time the achievement of the properties and performance required.

The inventors of the present invention have surprisingly discovered that the sludge of the invention, resulting from de-inked paper recycling processes and having a particle size distribution in the range from 30 to 1000 µm, is therefore not a simple inert material, but presents stabilization properties in presence of water and such specific rheological characteristics as to constitute active material in the compositions for building construction.

DETAILED DESCRIPTION OF THE INVENTION

Figure 1:
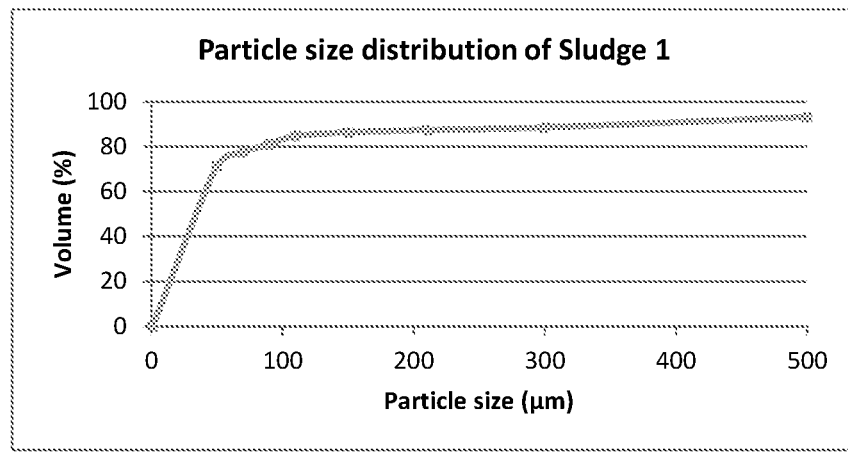
FIG. 1 is the particle size distribution graph of the sludge prepared in Example 1.

Therefore, the invention relates to a composition for building construction comprising a paper sludge deriving from de-inked paper recycling processes and having a grain size distribution D90 in the range of 30 to 1000 µm, and an ingredient selected from the group consisting of modified cellulose, cement, furnace slag and mixtures thereof.

The sludge resulting from de-inked paper recycling processes is then the source for the preparation of the invention additive material.

In a preferred embodiment, it is further dried in a drum kiln with forced ventilation in hot air or by irradiation, thus obtaining a material having a moisture content below or equal to 15% by weight, preferably reduced to less than 5% in weight, still more preferably less than 2% in weight.

The sludge of the composition of the invention, resulting from de-inked paper recycling processes and used as a source for the preparation of the invention additive material may present the above preferred humidity percentages and therefore the drying steps could be avoided.

The dried sludge is preferably composed of an organic component of cellulosic fibers and inorganic fillers consisting of aggregates of variable size.

The inorganic component generally comprises carbonates, silica and silicates.

In one preferred embodiment of the invention, sludges resulting from de-inked paper recycling processes, optionally dried, have the following preferred chemical composition:

TABLE 1

| Components | % (weight/weight) |
|---|---|
| Organic component | 20-40% |
| Carbonates | 40-70% |
| Silica and silicates | 0-15% |
| Humidity | 1-15% |

According to the invention, the dried sludge can be subjected to a sieving procedure, by means of vibrating industrial screens, and/or a grinding process with ball or hammers grinding mills, and both procedures may be carried out in any order, until a particle size distribution D90 is obtained in the range of 30 to 1000 µm.

This particle size distribution may be determined using normalized sieves with 50 µm pitch intervals, by laser granulometer for the interval from 0 to 1000 µm, and by means of vibrating screens for the range of 50 to 4000 µm.

Preferably, this particle size distribution D90 is in the range of 40 to 750 µm, more preferably of 50 to 450 µm.

For the purposes of the invention, the sludge, optionally dried, sieved and/or ground, forms a dry mass having an average particle size D90 in the range of 30 to 1000 µm.

In a first preferred embodiment the composition for building construction comprises a paper sludge deriving from de-inked paper recycling processes and having a grain size distribution D90 in the range of 30 to 1000 µm, and an ingredient selected from the group consisting of cement, furnace slag and a mixture of cement and furnace slag.

Preferably, in said first preferred embodiment, the composition for building construction is a composition comprising an amount of 0.3 to 10% by weight of sludge and an amount of 90 to 99.7% by weight of an ingredient selected from the group consisting of cement, furnace slag, and mixtures of cement and furnace slag, with respect to the total weight of the composition.

Even more preferably, in said first preferred embodiment, the composition for building construction is a composition comprising an amount of 0.3 to 10% by weight of sludge and an amount of 90 to 99.7% by weight of cement, with respect to the total weight of the composition.

In a further preferred embodiment, the composition for building construction comprises a sludge resulting from de-inked paper recycling processes and having a particle size distribution D90 in the range of 30 to 1000 µm, and modified cellulose. Preferably, in this further preferred embodiment, the composition for building construction is a composition comprising sludge in an amount of 60 to 95% by weight and modified cellulose in an amount of 5 to 40% by weight, with respect to the total weight of the composition.

In yet a further embodiment, the composition for building construction comprises a paper sludge resulting from de-inked paper recycling processes and having a grain size distribution D90 in the range of 30 to 1000 µm, modified cellulose and an ingredient selected from the group consisting of cement, furnace slag and a mixture of cement and furnace slag.

Preferably, in this yet further preferred embodiment, the composition for building construction is a composition comprising an amount of 0.2 to 9% by weight of sludge, an amount of 0.1% to 1% by weight of modified cellulose and an amount of 90 to 99.6% of an ingredient selected from the group consisting of cement, furnace slag and mixtures of cement and furnace slag, with respect to the total weight of the composition.

In further advantageous embodiments, the compositions of the invention further comprise an inert material selected in the group consisting of sand, gravel, clay, vermiculite and perlite, preferably sand.

In these advantageous further embodiments, the compositions comprise cement, furnace slag or mixtures of cement and furnace slag, preferably in amounts of 15% to 50%.

Preferably, these compositions of the further advantageous embodiments comprise at most 8% by weight of the sludge of the invention with respect to the weight of the final composition. More preferably, the sludge is present in amounts that range from 0.3% to 2% with respect to the weight of the final composition.

The modified cellulose is preferably present in the composition of said further advantageous embodiments in an amount of at most 0.6% by weight with respect to the weight of the final composition. More preferably, in these further advantageous embodiments, the modified cellulose is present in an amount of 0.02% to 0.4% with respect to the total weight of the final composition.

The modified cellulose of any embodiment of the composition according to the invention is preferably selected from the group consisting of methyl hydroxyethyl cellulose, methyl hydroxypropyl cellulose, hydroxyethyl cellulose, cellulose derivated from guar rubbers, and other cellulose derivatives normally used in the industry. More preferably, said modified cellulose is selected from the group consisting of methyl hydroxyethyl cellulose, methyl hydroxypropyl cellulose and hydroxyethyl cellulose, even more preferably and it is methyl hydroxyethyl cellulose. The composition of the invention, in any embodiment thereof, may also comprise a resin, preferably ethylene-vinyl acetate, vinylversatate, an acrylic resin, a vinyl resin, a styrene-acrylic resin, or other resin normally used in the industry. More preferably, the resin is selected from the group consisting of Ethylene Vinyl Acetate, Vinyl Versatate, Vinyl Acetate Acrlyate and Acrylate.

Advantageously, the sludge of the composition of the invention, due to its properties also allows a reduction of the necessary amount of resin, thereby further reducing the cost of compositions.

Preferably, the composition of the invention is an adhesive composition.

In accordance with European standards, an adhesive composition for building construction, once mixed with water to obtain a building material, can advantageously produce an adherence value of more than 0.2 MPa, according to UNI EN 1348. Therefore, the composition of the invention will be adhesive if, once mixed with water to obtain a building material, shows an adherence value greater than 0.2 MPa, according to UNI EN 1348.

Under a further aspect, an object of the present invention is a composition comprising a paper sludge deriving from de-inked paper recycling processes and having a grain size distribution D90 in the range of 30 to 1000 µm, modified cellulose, a first ingredient selected from the group consisting of cement, furnace slag and mixtures thereof, and a second ingredient selected from the group consisting of sand, gravel, clay, vermiculite and perlite.

Under a further aspect, the invention relates to the use of the composition of the invention comprising a paper sludge deriving from de-inked paper recycling processes and having a grain size distribution D90 in the range of 30 to 1000 µm, modified cellulose, a first ingredient selected from the group consisting of cement, furnace slag and mixtures thereof, and a second ingredient selected from the group consisting of sand, gravel, clay, vermiculite and perlite, for the preparation of adhesive compositions, compositions for bedding mortars, compositions for skim coats, compositions for repair mortar, compositions for self-leveling mortars, compositions for plasters, compositions for joining grouts.

In fact, the presence of this sludge in the compositions of the invention used for the preparation of adhesive compositions, compositions for bedding mortars, compositions for skim coats, compositions for repair mortar, compositions for self-leveling mortars, compositions for plasters, compositions for joining grouts, allows the use of total amount of modified cellulose considerably smaller than those currently used.

Preferably, under said different further aspect, the invention concerns the use of the composition of the invention for the preparation of an adhesive composition.

Under a further aspect, the invention relates to a material for building construction comprising the composition of the invention and water.

Preferably, the material for building construction comprises therefore cement, furnace slag, and mixtures of cement and furnace slag, in amounts of 15 to 50%, even more preferably of 20 to 45% relative to the weight of the building material.

In accordance with European standards, an adhesive is a material for building construction that can advantageously show an adherence value of more than 0.2 MPa, according to UNI EN 1348.

Even more preferably, this material for building construction of the invention is therefore an adhesive.

In another aspect, the invention relates therefore to the use of a paper sludge deriving from de-inked paper recycling processes and having a grain size distribution D90 in the range of 30 to 1000 µm as additive in building construction. The sludge as a material, when employed in compositions for building construction directed to the preparation of materials for the building industry, such as adhesives, skim coats, mortars for bedding, repair mortars, self-leveling, grouts, plasters, joining grouts, increases both retention and demand of water, thereby increasing the drying time, and therefore the stability, as well as the workability. Moreover, the sludge increases the thixotropy of the compositions to which is added, meaning the ability to avoid leakages from vertical walls and changes in its thickness after application.

Moreover, the sludge in the adhesive compositions reduces formation of a dry film on the surface, which film causes the reduction of its adhesive strength and increases the wettability of the surfaces, for example, in the application of tiles. In plasters and mortars the sludge also reduces the shrinkage by acting as a compensator additive in the drying step.

The advantageous properties of the composition of the invention and the sludge as material for building construction are also supported by the experimental section that follows.

EXPERIMENTAL SECTION

Example 1: Preparation of Sludge 1

A sludge resulting from de-inked paper recycling processes, further dried to reduce its water content to below about 2% (weight/weight) and having the chemical characteristics indicated in Table 2:

TABLE 2

| Components | Unit of measurement | Average values | Standard Dev. |
|---|---|---|---|
| Ashes at 450° C. | % (weight/weight) | 69.9 | 3.8 |
| Organic component | % (weight/weight) | 28.1 | 3.8 |
| Fraction of acid soluble ashes (carbonates) | % (weight/weight) | 60 | 2.0 |
| Fraction of acid insoluble ashes (silica and silicates) | % (weight/weight) | 6.21 | 3.5 |
| In-solvent soluble fraction (inks) | % (weight/weight) | 1.50 | 0.2 |
| Humidity | % (weight/weight) | 1.95 | 1.2 |
| pH | | 7.5 | 0.12 | was ground with a ball mill until the particle size distribution shown in the following Table 3 and represented in FIG. 1 was obtained.

TABLE 3

| Size (μm) | Sludge 1 (vol %) |
|---|---|
| 50 | 71.4 |
| 70 | 77.6 |
| 90 | 81 |
| 110 | 84.7 |
| 150 | 86.3 |
| 210 | 87.4 |
| 300 | 88.5 |
| 500 | 93.2 |

Example 2: Preparation of Sludge 2

Figure 2:
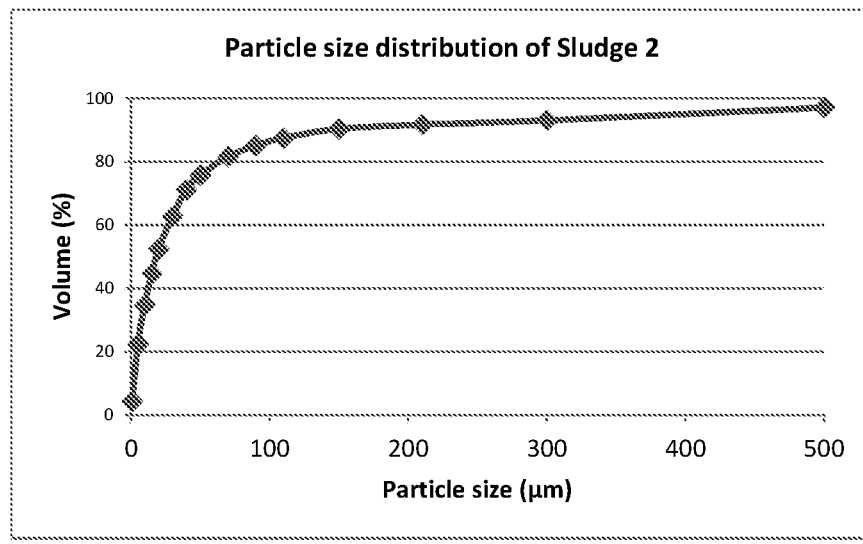
FIG. 2 is the particle size distribution graph of the sludge prepared in Example 2.

The sludge having the chemical characteristics indicated in Table 2 of Example 1 resulting from de-inked paper recycling processes was ground with a hammer mill to obtain the particle size distribution shown in Table 4 below and represented in FIG. 2.

TABLE 4

| Size (μm) | Sludge 2 (vol %) |
|---|---|
| 1 | 4.2 |
| 5 | 22.36 |
| 10 | 34.8 |
| 15 | 44.7 |
| 20 | 52.3 |
| 30 | 62.8 |
| 40 | 71.0 |
| 50 | 75.7 |
| 70 | 81.5 |
| 90 | 85.0 |
| 110 | 87.4 |
| 150 | 90.3 |
| 210 | 91.7 |
| 300 | 93.0 |
| 500 | 97.0 |

Example 3: Preparation of an Adhesive Composition

The further dried and ground sludges of Examples 1 and 2 were employed for the preparation of adhesive compositions. To evaluate the above compositions an adhesive composition was also prepared according to the known technique. The ingredients and their quantities (expressed in kilograms) are shown in Table 5 below.

TABLE 5

| Adhesive ingredients | Adhesive composition of the prior art | Adhesive composition 1 | Adhesive composition 2 |
|---|---|---|---|
| Sludge 1 | | 0.3 | |
| Sludge 2 | | | 0.3 |
| Ethylene vinyl acetate | 2 | 2 | 2 |
| Methyl hydroxyethyl cellulose | 0.4 | 0.4 | 0.4 |
| Cement | 36.2 | 36.2 | 36.2 |
| Sand | 61.0 | 61.0 | 61.0 |

The above compositions, after having been added with just enough water to make them spreadable, were then evaluated to detect the effect on performance due to the addition of the sludge.

In particular, the adherence parameters according to the guidelines of the UNI EN 1348 were assessed, as well as the open time parameters according to the guidelines of the UNI EN 1346, and the wettability parameter according to the guidelines of the UNI EN 1347.

The results reported in Table 6 were obtained.

TABLE 6

| | Adhesive material of the prior art, prepared with adhesive compos. of the prior art | Adhesive material 1 prepared with . adhesive compos. 1 | Adhesive material 2 prepared with . adhesive compos. 2 |
|---|---|---|---|
| Adhesion in 5 minutes (MPa) | 0.7 | 1.4 | 0.9 |
| Open time in 10 min (MPa) | 0.5 | 1.0 | 0.7 |
| Open time in 20 min (MPa) | 0.1 | 0.5 | 0.4 |
| Open time in 30 min (MPa) | 0.1 | 0.3 | 0.3 |
| Wettability in 10 min | 90% | 90% | 90% |
| Wettability in 20 min | 60% | 90% | 80% |
| Wettability in 30 min | 25% | 90% | 60% |

As shown in Table 6, adhesive materials of the invention showed better adhesion and better wettability. In particular, the excellent performance of the adhesive composition 1, in which the sludge of Example 1 was added, resulted clearly evident.

Example 4: Preparation of an Adhesive Composition Comprising Furnace Slag

The further dried and milled sludge of Example 1 was employed for the preparation of other adhesive compositions.

Referring to these compositions, furnace slag or a mixture of furnace slag and cement was used in the composition of the invention, and adhesive composition 3 and adhesive composition 4 were obtained respectively.

Table 6 below shows for comparison also the adhesive composition of the known technique of the previous example.

The ingredients and their quantities (expressed in kilograms) are shown in Table 7 below.

TABLE 7

| ingredients | Adhesive composition of the prior art | Adhesive composition 3 | Adhesive composition 4 |
|---|---|---|---|
| Sludge 1 | | 0.3 | 0.3 |
| Ethylene vinyl acetate | 2 | 2 | 2 |
| Methyl hydroxyethyl cellulose | 0.4 | 0.4 | 0.4 |
| Cement | 36.2 | 0 | 3.6 |
| Furnace slag | 0 | 36.2 | 32.6 |
| Sand | 61.0 | 61.0 | 61.0 |

The above compositions, after having been added with just enough water to make them spreadable, were then evaluated to detect the effect on performance due to the addition of the sludge.

In particular, the adherence parameters according to the guidelines of the UNI EN 1348 were assessed, as well as the open time parameters according to the guidelines of the UNI EN 1346, and the wettability parameter according to the guidelines of the UNI EN 1347.

The results reported in Table 8 were obtained.

TABLE 8

| | Adhesive material of the prior art, prepared with adhesive compos. of the prior art | Adhesive material 3 prepared with . adhesive compos. 3 | Adhesive material 4 prepared with . adhesive compos. 4 |
|---|---|---|---|
| Adhesion in 5 minutes (MPa) | 0.7 | 1.1 | 1.3 |
| Open time in 10 min (MPa) | 0.5 | 0.9 | 1.0 |
| Open time in 20 min (MPa) | 0.1 | 0.4 | 0.4 |
| Open time in 30 min (MPa) | 0.1 | 0.3 | 0.3 |
| Wettability in 10 min | 90% | 90% | 90% |
| Wettability in 20 min | 60% | 80% | 90% |
| Wettability in 30 min | 25% | 70% | 80% |

As seen from Table 8, also the adhesive materials of the invention comprising furnace slag or mixtures of furnace slag and cement, instead of cement, showed better adherence and better wetting compared to adhesive compositions of the prior art.

Example 5: Comparative Evaluation of Adhesive Compositions According to the Invention The further dried and milled sludge of Example 1 was employed for the preparation of an adhesive composition with reduced amounts of modified cellulose and resin. To evaluate the performance of the above compositions, an adhesive composition was also prepared according to the known technique.

The ingredients and their quantities (expressed in kilograms) are shown in Table 9 below.

TABLE 9

| ingredients | Adhesive composition of the prior art | Adhesive composition A of the prior art | Adhesive composition 5 | Adhesive composition 6 |
|---|---|---|---|---|
| Sludge 1 | — | — | 0.3 | 1 |
| Ethylene vinyl acetate | 2 | 1 | 1 | 1 |
| Methyl hydroxyethyl cellulose | 0.4 | 0.2 | 0.2 | 0.2 |
| Cement | 36.2 | 36.2 | 36.2 | 36.2 |
| Sand | 61.0 | 61.0 | 61.0 | 61.0 |

The above compositions were then evaluated to detect the effect due to the addition of the sludge.

Adherence, open time and wettability have been assessed as in Examples 3 and 4 above.

The obtained results are reported in Table 10, which also shows an economic assessment of the cost per unit obtained (expressed in EUR per ton) for each individual composition.

TABLE 10

| | Adhesive material of the prior art, prepared with adhesive compos. of the prior art | Adhesive material of the prior art, prepared with adhesive compos. of the prior art | Adhesive material 5 prepared with . adhesive compos. 5 | Adhesive material 6 prepared with . adhesive compos. 6 |
|---|---|---|---|---|
| Adhesion in 5 minutes (MPa) | 0.7 | 0.2 | 0.5 | 0.7 |
| Open time in 10 min (MPa) | 0.5 | 0 | 0.2 | 0.3 |
| Open time in 20 min (MPa) | 0.1 | 0 | 0.1 | 0.1 |
| Open time in 30 min (MPa) | 0.1 | 0 | 0 | 0.1 |
| Wettability in 10 min | 90% | 70% | 90% | 90% |
| Wettability in 20 min | 60% | 30% | 70% | 85% |
| COST (€/ton) | 982 | 709 | 739 | 803 |

As seen from Table 10, the halving of the amount of resin and modified cellulose, in preparations without sludge, leaded to a drastic drop of all the performances of the material.

On the contrary, the insertion of the sludge in the adhesive cement composition, even in the presence of half doses of cellulose and resin (compositions 5 and 6) allowed an important recover of the performance of the material.

In composition 6, with higher sludge content, performance became even comparable to the performance of the prior art obtained with compositions having double content of cellulose and resins, effectively allowing the obtaining of a new material with important performance and greatly reduced cost.

It was finally noted that the increase of the sludge content in composition 6 led to an improvement of the performance of material 6 with respect to material 5, which had a sludge content lower in its initial composition.

Example 6: Evaluation of Performance of the Adhesive Material of the Invention The adhesive material 1 prepared in Example 3 was tested on a substrate, specifically a tile, in order to evaluate water retention capacity. It was possible to observe that the adhesive material of the invention allowed for proper adhesion to the tile and was able to break the formation of the dry film material, which is normally generated with the adhesives currently on the market. The sludge also conferred a higher water retention to the final material, in this case an adhesive. Moreover, it enabled a reduction of the loss of water by acting also on the film and breaking it through the creation of channels that maintained its layer thinner. Finally, The adhesive of the invention resulted also more stable and with greater degree of thixotropicity.

Example 7. Evaluation of Performance of the Bedding Mortar Material of the Invention The composition of the invention was prepared in order to obtain a composition for bedding mortar.

The composition for bedding mortar was obtained by mixing 25 kg of cement, 75 kg of sand, 0.03 kg of methyl hydroxyethyl cellulose (MHEC), 0.3 kg of the sludge 1 of the example 1.

This composition for bedding mortar was mixed with water up to the right consistency to make it spreadable.

This mortar thus obtained was used to bond the bricks in the creation of a vertical wall. It is well known that the weight of the brick presses the mortar affecting the regularity of the wall. The inventors have found that the presence of the sludge in the mortar contrasted the yielding caused by the weight, giving a higher viscosity to the system that generated opposite forces which contrasted the weight.

Example 8. Evaluation of Performance of the Adhesive Material of the Invention The adhesive material 1 prepared in Example 3 was tested in vertical gluing of a tile. The weight force generated by the tile mass and the shear forces between the surface of the adhesive and the tile surface tend to make the tile slide downwards and detach.

In conventional adhesives, the drawback is counteracted by the use of important amounts of modified celluloses.

The sludge, used in the adhesive material of the invention, reduced the vertical slip thanks to an increase of the viscosity, that generated opposite forces, which contrasted the slippage. At the same time the sludge, present in the adhesive of the invention, increased the resistance to cutting forces through the reduction of the hardened material film (and to an increase of the contact surface between the tile and the adhesive material) thanks to channels that broke the surface film.

Example 9. Evaluation of Performance of the Fluid Mortar Material of the Invention It is known that in fluid mortars, such as self-leveling screeds, repair mortars, grouting mortars, industrial floors, low thickness self-leveling mortars, the aggregates subject to their own weight, all of which have a higher density than the mineral binding matrix, tend to precipitate to the bottom.

The material of the invention, a fluid mortar prepared by mixing a composition comprising 0.4 kg of the sludge of Example 1, 30 kg of cement, 70 kg of sand, 0.03 kg of methyl hydroxyethyl cellulose (MHEC) and 1 kg of ethylene vinyl acetate (EVA) in water, was tested in the application and it was found that it generated opposite forces that contrasted the phenomenon of the precipitation of the aggregates. Moreover, fluid mortar of the invention showed an increased water retention, limiting the phenomenon of sudden loss of water due to the absorbency of water by the substrate on which it was applied. Therefore, the contrast to migration, combined with the contrast to segregation of the aggregates, avoided the formation of cement grout puddles on the surface of the mortar. These grouts represent in fact a significant disadvantage in that they are inconsistent and with time tend to break away, thus worsening the quality of the application substrate.

Example 10. Evaluation of Performance of the Skim Coat Material of the Invention A skim coat was prepared with the sludge by adding water to a composition of the invention obtained by mixing 0.5 kg of the sludge of Example 1, 35 kg of cement, 65 kg of sand, 0.15 kg of methyl hydroxyethyl cellulose (MHEC) and 2 kg ethylene vinyl acetate (EVA).

It is known that the sudden loss of water and the normal processes of hydration tend to reduce the volume of the mortar and creates lesions in the application substrate, which limit the mechanical resistance. With the skim coat of the invention the inventors have found that there was an increase in both the water retention and an opposition to the mechanical resistance to the forces, thereby reducing the problem. A limitation to the formation of lesions was therefore found.

Example 11. Evaluation of Performance of the Plaster Material of the Invention A plaster was prepared a with the sludge of Example 1.

In particular, the plaster was obtained by adding water to a composition of the invention obtained by mixing 0.5 kg of the sludge of Example 1, 20 kg of cement, 80 kg of sand and 0.08 kg of modified cellulose (MHEC).

It is known that when a plaster is applied to a wall or a vertical surface, the weight, in the plastic phase, tends to detach the plaster from the surface. At the same time, in such a plastic phase the weight tends to make the material yield by making it slide on itself, thus compromising the dimensional stability. The inventors have found that the presence of the sludge in the plaster of the invention, thanks to its ability to make the substrate more wettable, and the increase thixotropy, generated adhesion forces which contrasted detachment, leakage and lesions.

The invention claimed is:

1. A composition for building construction comprising a paper sludge deriving from de-inked paper recycling, the sludge having a grain size distribution D90 in the range of 30 to 1000 µm and an ingredient selected from the group consisting of modified cellulose, cement, furnace slag and mixtures thereof, wherein the composition comprises at least one resin selected from the group consisting of ethylene vinyl acetate, vinyl versatate, acrylic resins, vinyl resin, and styrene-acrylic resins.

2. The composition for building construction according to claim 1, wherein the grain size distribution D90 of the paper sludge deriving from de-inked paper recycling is in the range of 40 to 750 µm.

3. The composition for building construction according to claim 1, wherein the paper sludge deriving from de-inked paper recycling has a moisture content below than or equal to 15% by weight.

4. The composition for building construction according to claim 1, wherein the paper sludge deriving from de-inked paper recycling has the following chemical composition:

| Components | % (weight/weight) |
|---|---|
| Organic component | 20-40 |
| Fraction of acid soluble ashes (carbonates) | 40-70 |
| Fraction of acid insoluble ashes (silica and silicates) | 0-15. |

5. The composition for building construction according to claim 1, wherein said ingredient is selected from the group consisting of cement, furnace slag and mixtures thereof.

6. The composition for building construction according to claim 5, wherein said ingredient is cement.

7. The composition for building construction according to claim 5, further comprising modified cellulose.

8. The composition for building construction according to claim 1, wherein said ingredient is modified cellulose.

9. The composition according to claim 1, comprising an inert ingredient selected from the group consisting of sand, gravel, clay, vermiculite and perlite.

10. The composition according to claim 1, wherein said modified cellulose is selected from the group consisting of methyl hydroxyethyl cellulose, methyl hydroxypropyl cellulose, hydroxyethyl cellulose and celluloses deriving from guar rubber.

11. The composition according to claim 1, comprising the paper sludge in amount of at most 8% by weight with respect to the weight of the composition, and cellulose in amount of at most 0.6% by weight with respect to the weight of the composition.

12. A material for building construction comprising the composition for building construction according to claim 1 and water.

13. The material for building construction according to claim 12, wherein said material for building construction is an adhesive.

* * * * *